A. BREDENBERG.
BOOKBINDING AND COVERING MACHINE.
APPLICATION FILED DEC. 19, 1905.
1,073,324.
Patented Sept. 16, 1913.
7 SHEETS—SHEET 4.
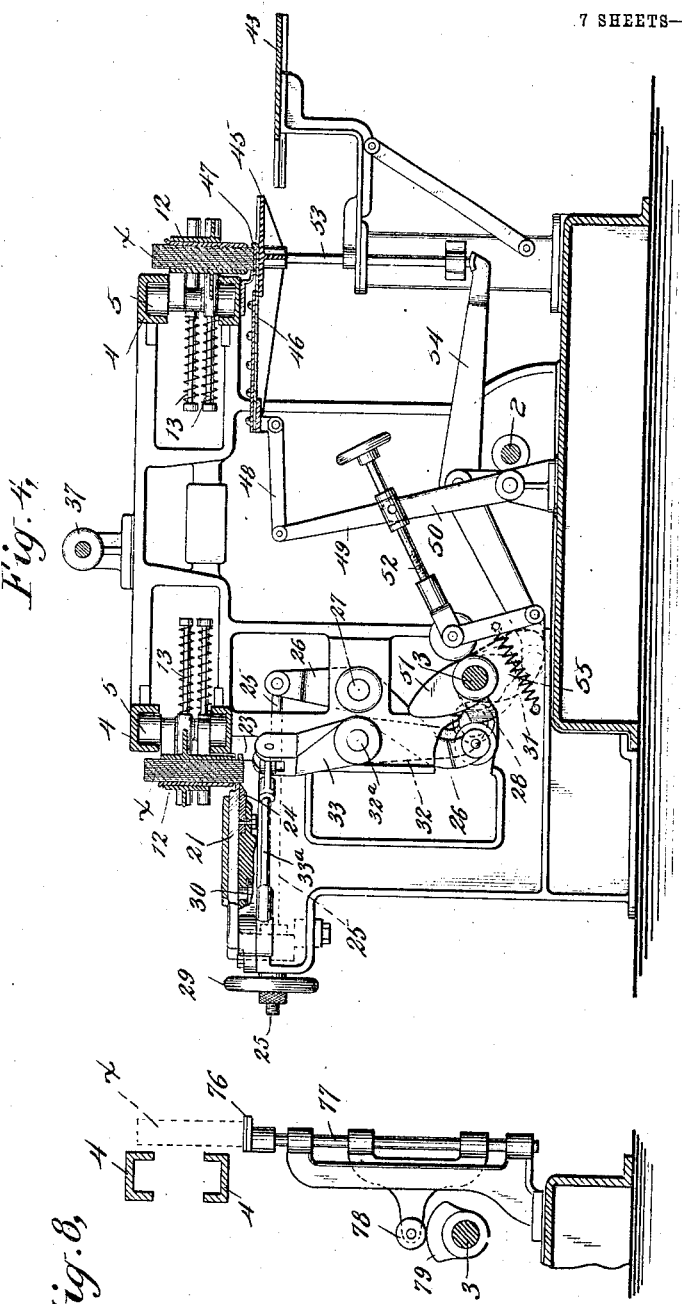
WITNESSES:
Rollin Abell
Wm J. Dolan
INVENTOR
Alfred Bredenberg
BY
J. H. Freeman
ATTORNEY

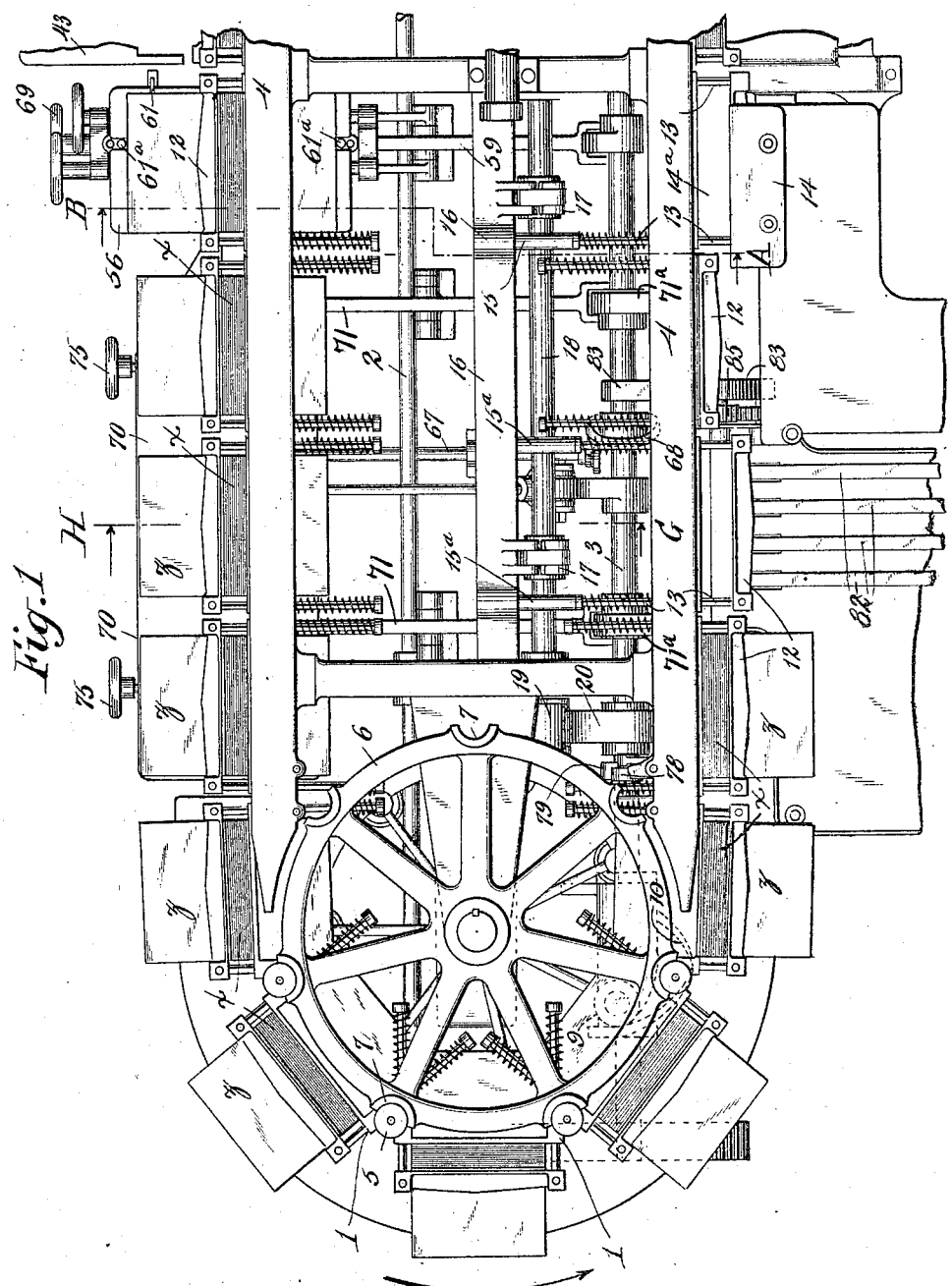

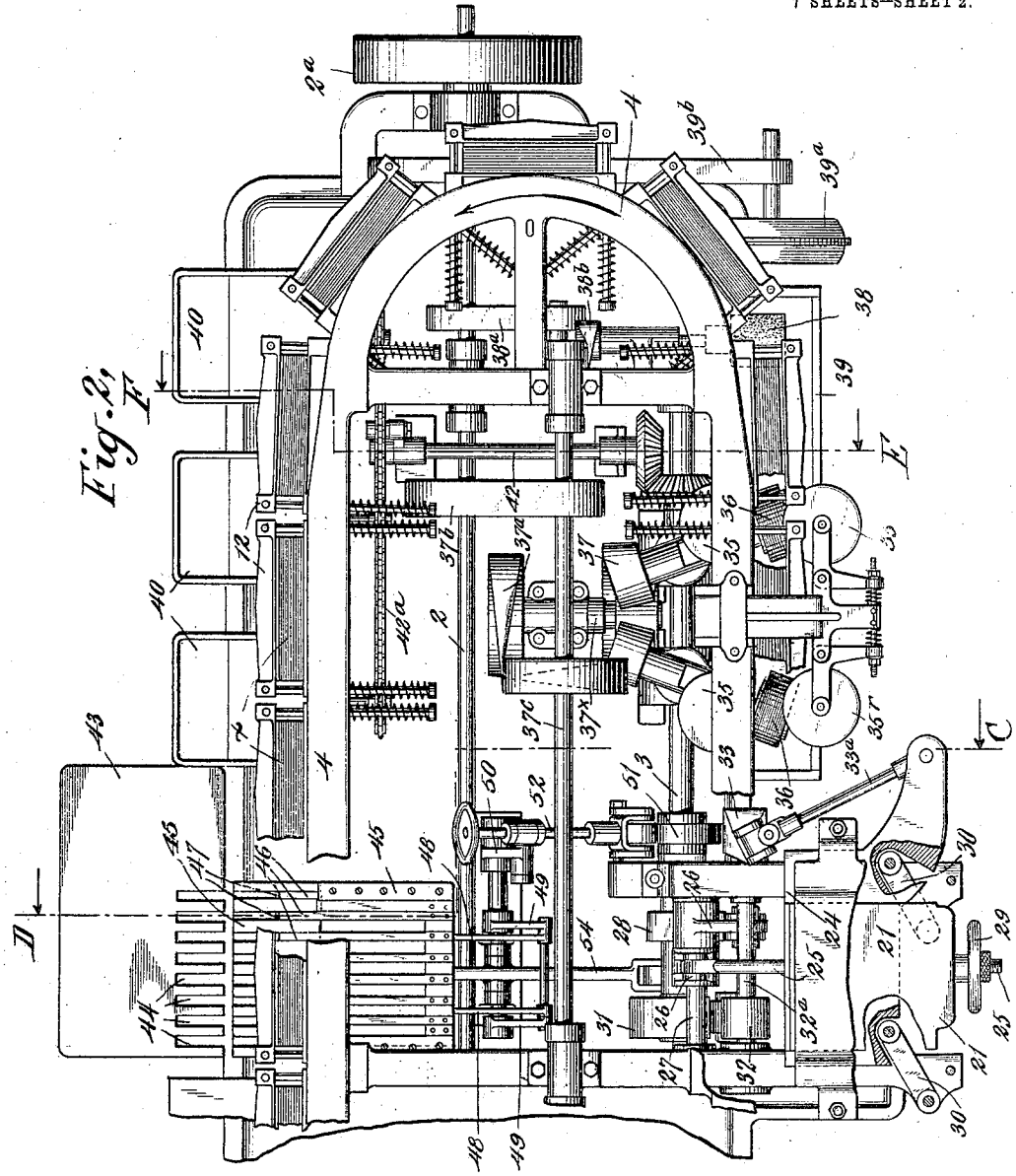

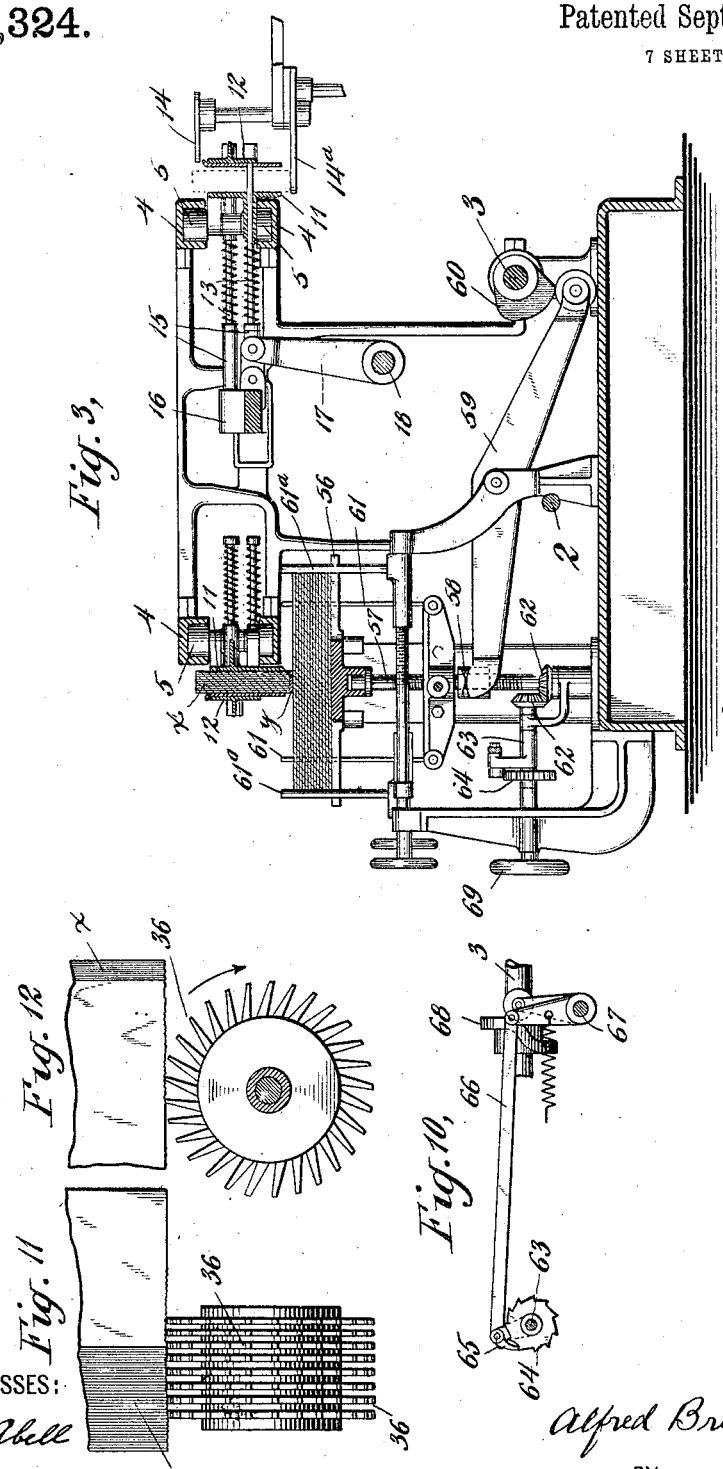

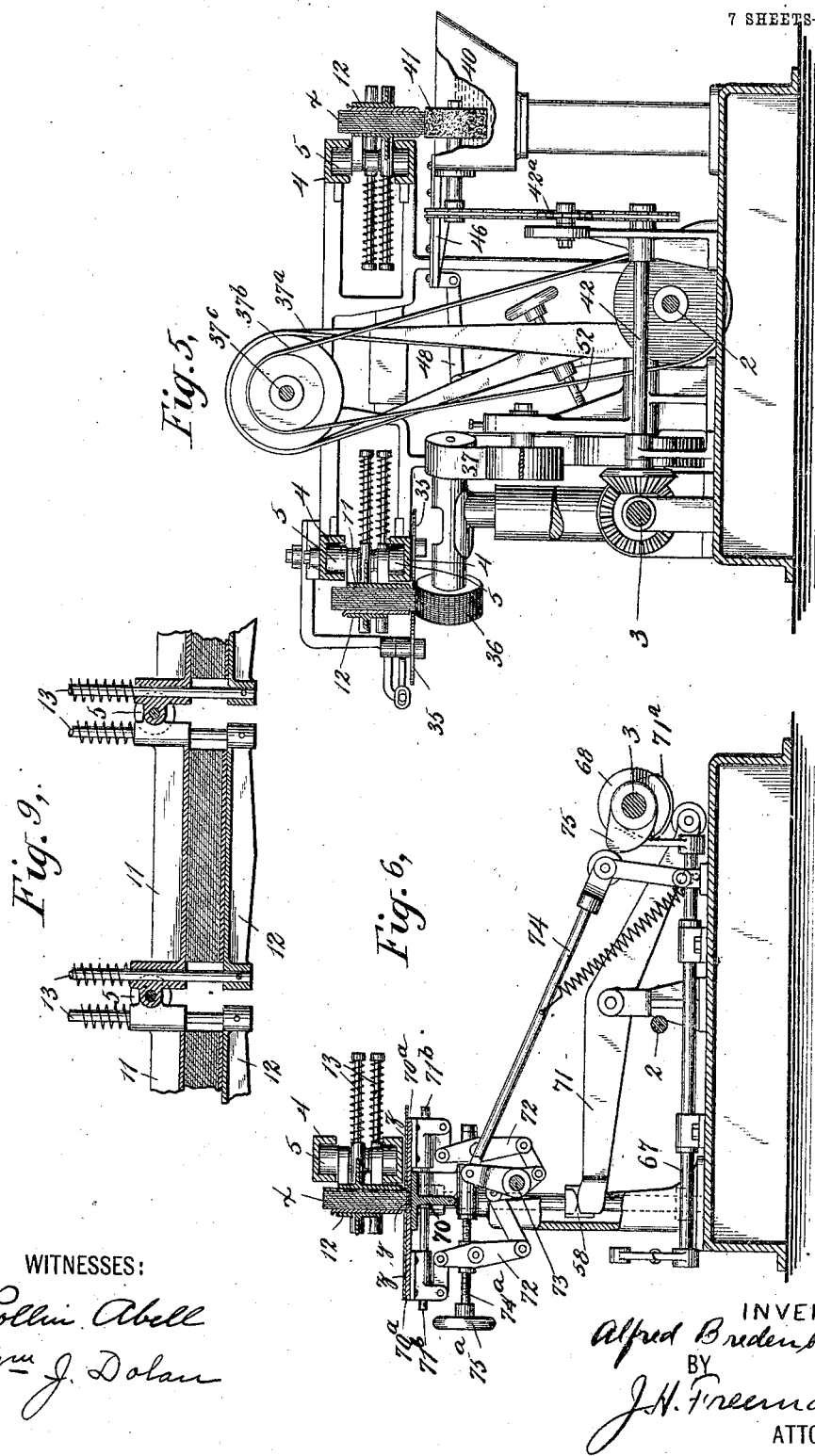

A. BREDENBERG.
BOOKBINDING AND COVERING MACHINE.
APPLICATION FILED DEC. 19, 1905.
1,073,324.
Patented Sept. 16, 1913.
7 SHEETS—SHEET 6.
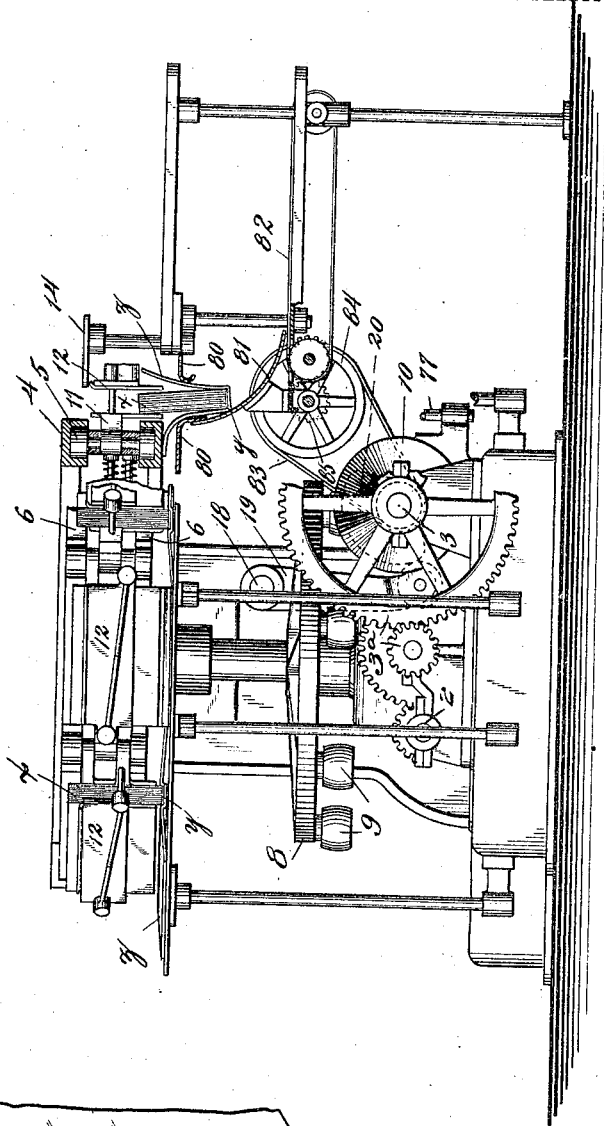
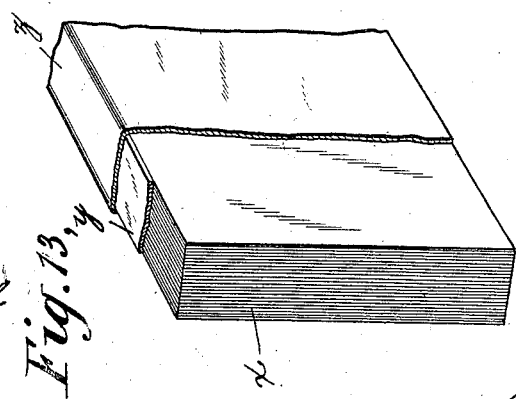
WITNESSES:
Rollin Abell
Wm J. Dolan
INVENTOR
Alfred Bredenberg
BY
J.H. Freeman
ATTORNEY A. BREDENBERG.
BOOKBINDING AND COVERING MACHINE.
APPLICATION FILED DEC. 19, 1905.
1,073,324.
Patented Sept. 16, 1913
7 SHEETS—SHEET 7.
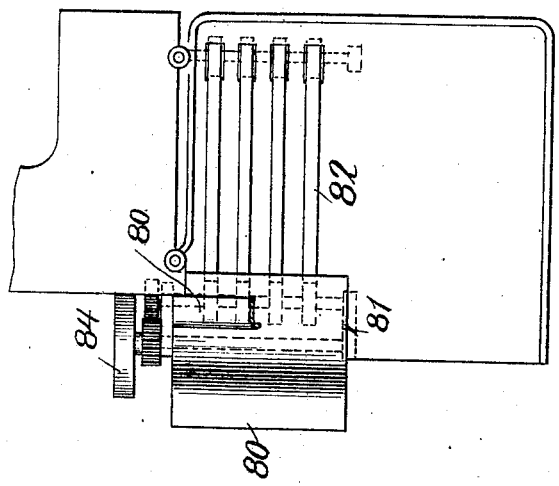
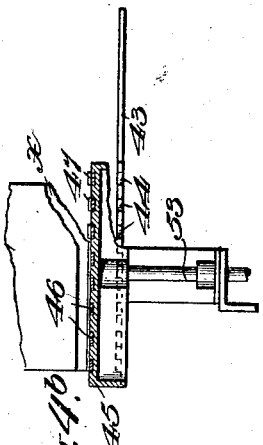
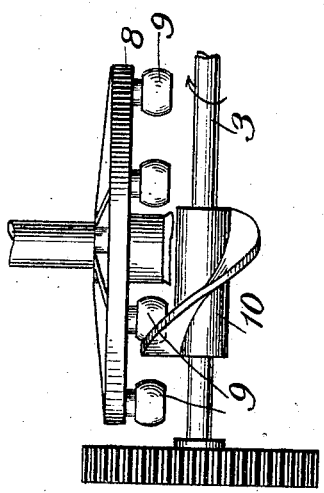
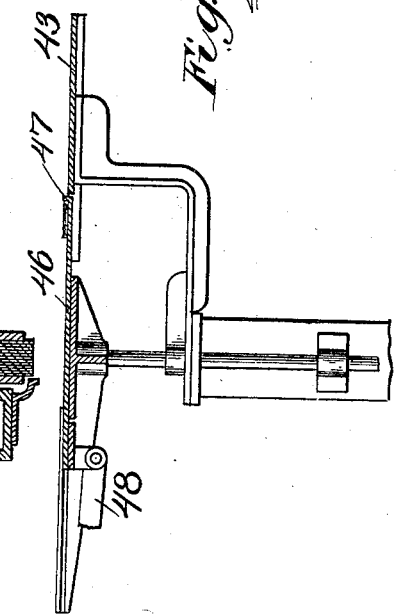
WITNESSES:
INVENTOR
Alfred Bredenberg
BY
J. H. Freeman
ATTORNEY

UNITED STATES PATENT OFFICE.

ALFRED BREDENBERG, OF CHAMPLAIN, NEW YORK, ASSIGNOR OF ONE-HALF TO THE SHERIDAN IRON WORKS, A CORPORATION OF NEW YORK, AND ONE-HALF TO T. W. & C. B. SHERIDAN COMPANY, A CORPORATION OF NEW YORK.

BOOKBINDING AND COVERING MACHINE.

1,073,324.   Specification of Letters Patent.   Patented Sept. 16, 1913.

Application filed December 19, 1905. Serial No. 292,407.

*To all whom it may concern:*

Be it known that I, ALFRED BREDENBERG, a citizen of the United States, and a resident of Champlain, Clinton county, New York, have invented certain new and useful Improvements in Bookbinding and Covering Machines, of which the following is a specification.

The invention relates to book binding and covering machines, and while more particularly addressed to those machines in which groups of leaves or signatures, which are to constitute the books, are conveyed consecutively into operative relation with successive mechanisms designed to operate thereon, and in the proper order of sequence, for performing various steps included in the work of binding and covering, various features of the invention may be employed in other relations.

Objects of the invention are to provide a machine which shall be of economical construction; which shall occupy a relatively small space; which is capable of operating on books of practically any width of page; and which shall have the various parts conveniently and accessibly arranged.

A further object of the invention is to provide improved parts or mechanisms within the machine for the purpose of performing the various operations of binding and covering.

These and other objects of invention will in part be obvious and in part will more fully appear hereinafter.

The invention consists in the novel parts, improvements, mechanisms, combinations, and arrangements herein shown and described.

The accompanying drawings, referred to herein and forming a part hereof, illustrate one embodiment of the invention, the same serving in connection with the description herein to explain the principles of the invention.

Of the drawings: Figures 1 and 2 are plan views of a machine embodying the invention, the said figures together illustrating the entire machine; Fig. 3 is an elevation, partly in section, on the line A—B of Fig. 1; Fig. 4 is a similar view on the line C—D of Fig. 2; Fig. 4ª is a sectional view illustrating on a larger scale parts shown at the right in Fig. 4. Fig. 4ᵇ is a vertical transverse section taken on a plane at right angles to that represented in Fig. 4ª. Fig. 5 is a similar view on line E—F of Fig. 2; Fig. 6 is a similar view on line G—H of Fig. 1; Fig. 7 is a view in left-hand end elevation, taken with reference to Figs. 1 and 2; Fig. 7ª is a plan view illustrating on a larger scale features shown at the right in Fig. 7. Fig. 7ᵇ is a side elevation illustrating on a larger scale part of the driving mechanism illustrated in Fig. 7. Fig. 8 is a detail view of the pressing or smoothing mechanisms; Fig. 9 is a detail sectional view of the holding mechanism for the book; Fig. 10 is a detail view of the feeding-up mechanism for the cover-holding table; Figs. 11 and 12 are detail views of the roughing device; and Fig. 13 is a view showing an arrangement of the parts of a bound and covered book.

In the illustrated embodiment of the invention, the books are conveyed by suitable carrying means from one mechanism to another, each mechanism performing its functions in connection with each book as presented, the respective books during their progress being thus subjected to the cycle of operations involved in binding and covering and in the proper order. For convenience and for economy of time and space, as well as for other reasons, the carrier is constructed and arranged to travel in an endless path lying in a substantially horizontal plane and having a plurality of right-line stretches, and the various mechanisms are arranged along the said path and in a position to operate upon the books when presented to each mechanism by the carrier. The carrier, according to one feature of the invention, is arranged so that the greater portion of its extent is disposed in two parallel stretches, and it is so shown in the illustrated embodiment. With a carrier so constructed and arranged the various mechanisms which are to operate on the books may be disposed in two opposed series along the straight stretches of the carrier. By such an arrangement the floor space occupied by the machine is greatly reduced, the various mechanisms taking part in the binding and covering operations may be at substantially one level and within convenient reach of the operator, and practically the entire extent of the carrier may be utilized, as well as securing other advantages.

In the embodiment of the invention herein illustrated, an endless carrier 1 is shown arranged in a substantially horizontal plane and as being provided with means for supporting a series of groups of leaves or signatures, each such group generally constituting a book, and for carrying such books one by one to the various mechanisms, which are to operate upon them to produce the bound and covered book. In this embodiment the said carrier is arranged, as above indicated, so that a large part of its extent lies in comparatively long right-line stretches and at various points along said stretches the mechanisms which are constructed and designed to perform the various operations upon the books are arranged, and in such order that each book will be carried successively to the various mechanisms in the proper sequence as regards the operations to be performed, and in the proper positions with reference to the various mechanisms. As shown in Figs. 1 and 2 of the drawings, the carrier is disposed in two side by side substantially parallel right-line stretches, along each of which a part of the mechanisms are arranged. A suitable supporting structure for the carrier, the various mechanisms and the driving and actuating means is provided.

The driving means may be of any desired or convenient form, and in the present embodiment a form of such means is shown as comprising a power shaft 2, provided with a belt pulley 2ª, and a shaft 3 arranged parallel with the shaft 2 and driven therefrom but at a slower speed by any suitable means, such as a train of gears 3ª (see Fig. 7). The various parts and mechanisms are connected with these two shafts, as will be explained.

This invention has for an object the provision of a machine adapted to operate upon books of practically any dimension measured from the back to the front edges of the leaves. This is effected by providing a construction of carrier, bookholder upon the carrier, and guiding and supporting means for the carrier such that however far the books may extend beyond their holders they will not interfere with, or be interfered with by, the carrier and its guiding and supporting means. The particular form of the carrier shown herewith comprises link members 11 joined together but freely movable with reference to each other and having holding means for books and means for coacting with proper guiding and supporting means for holding the carrier to its path.

In the illustrated embodiment the guiding and supporting means are shown as located at one side of the carrier, the construction and arrangement of the parts being such that the carrier is not surrounded by, or included within, the structure of the guiding and supporting means. As shown, the guiding and suporting means comprises a guideway 4 arranged at one side of the carrier and the said guideway may include two members having opposed grooves, one arranged vertically over the other, and it is so shown. Suitable means for connecting the carrier and guiding and supporting means are provided, and such means are herein shown as comprising guide members 5 mounted on the carrier and running in the grooves of the guideway 4. The guide members 5 are shown as mounted on vertically arranged axes located at and forming the articulations of the link members 11 of the carrier.

Suitable driving means for the carrier are provided, such means being herein shown as a wheel or spider 6, comprising upper and lower members (see Fig. 7), each having upon its rim a number of pockets or depressions 7, adapted to receive the guide members 5. Means for rotating the wheel 6 are provided, the same being herein shown as including a wheel 8 fixed on the shaft of wheel 6 and provided with rolls 9 adapted to engage with a spiral cam 10, shown herein as mounted upon the shaft 3, the cam and rolls being arranged so that the carrier receives an intermittent movement.

In the embodiment of the invention herein shown, the holding means for the books are disposed on the opposite side of the carrier from the guideway 4, and are so constructed and arranged as to hold the book substantially parallel to the guideways 4 (see Figs. 1, 7, and 9). The particular form of holding means herein shown constitutes an automatic clamp, and as illustrated, it is provided with spring means for holding the groups of leaves or signatures constituting each book in position, said means being adapted to be thrown off or released when a clamp holder is in position for receiving or delivering a book. In the illustrated form, the holder comprises a plate 12, which is yieldably held to position toward each of the link members 11 of the carrier by suitable springs, herein shown as spiral springs coiled around the pins 13, which pins act as guiding and actuating means for the plate 12. The book is thus held or clamped in position between the link member 11 and plate 12. In the present embodiment the pins 13 are placed in staggered relation, in order that they may not interfere with the pins of contiguous holders while passing the wheel 6. In the present embodiment also the pins 13 are shown fixed to the plates 12 and moving in guide apertures in the link members 11. By this arrangement, as will be obvious from inspection of the drawing, the plates 12 will be pressed toward the link members 11, in their normal relation, thus holding the book firmly in position, as above stated, while pressure applied to the ends of the pins 13 will serve to move the plates 12 away from the link members 11, so as to release the book when it is desired to supply a book to or remove one from the holder.

In accordance with one feature of the invention the various mechanisms for performing successive operations on the book are arranged along the right line stretches of the carrier, said mechanisms being preferably arranged in opposed series along two parallel stretches.

In the illustrated embodiment the machine is shown as provided with a receiving or feeding-in mechanism, a trimming mechanism, a roughing mechanism, a brushing mechanism, adhesive-applying mechanisms, a mechanism for attaching a fiber strip to the book back, a cover-attaching mechanism, a cover-breaking mechanism, a smoothing device for the cover back, and a delivery or feeding-out mechanism. It may be found convenient to have the receiving and delivery mechanisms arranged adjacent to each other, and they are so shown, also as located near the middle of one of the parallel stretches of the carrier, the trimming, roughing and brushing mechanisms also being disposed in series on the same side of the carrier while the adhesive-applying, cover-attaching and cover-breaking mechanisms are shown arranged in opposite series along the other stretch of the carrier.

Suitable receiving means are provided and are herein shown (see Figs. 1, 2, and 7) as comprising tables 14 and 14ª, conveniently located with respect to the clamps, and also mechanism for separating the plates 12 and beds 11, so that the group of leaves or signatures may be properly deposited therein and for allowing the plate and bed to then firmly clamp them, so that they may be conveyed by the carrier to the respective mechanisms to be subjected to the various operations of binding and covering. In the present embodiment the controlling means for the clamps is shown as fingers 15, adapted to engage with the pins 13, and move them against the force of their springs to open the clamp. The said fingers 15 are herein shown (Figs. 1 and 3) as mounted upon a slidable rail 16, suitably supported in the frame of the machine to slide toward and from the pins 13 of the clamp which is then in the receiving or feeding-in position. The said rail receives its proper motion by any suitable connections, such connections being herein shown as arms 17, suitably linked to the said rail, and fixed on a shaft 18, which receives an oscillatory movement by proper connections with the driving mechanisms, the connections shown comprising an arm 19 co-acting with a cam 20 fixed on the shaft 3, (see Figs. 1, 7).

Next in order, in the illustrated embodiment, is arranged the trimmer mechanism (see Figs. 2 and 4). As herein shown, said mechanism comprises a clamping device 21, for the lower edges of the books and a moving knife 24, said knife being arranged to move in a plane parallel to that of the path of travel of the carrier. The clamp 21 is arranged to engage the lower edge of a group of leaves or signatures held in the carrier clamp, and to hold the same firmly against a cutting bed 23 while the knife 24 removes the protruding, folded over portions in the case of signatures, and in the case of loose leaves the protruding edges, so as to insure a uniform back surface. In the present embodiment the clamp is connected by means of a rod 25 to a lever 26 mounted upon a shaft 27, and having its other end coöperating with a cam 28 mounted upon the shaft 3. Suitable means for varying or adjusting the pressure of the clamping jaws may be provided. As shown, the same comprises a handwheel nut 29 threaded upon the end of the rod 25, and arranged to engage the clamp 21. It is desirable to give the knife a diagonal movement with relation to the bed and in the present embodiment of the invention means for giving such a movement to the knife 24 have been provided. As will be seen from Fig. 2, the said knife is pivoted to a fixed portion of the frame by links 30 and receives movement from the power shaft 3, through the medium of a cam 31 arranged to act upon an arm 32 fixed on a rock shaft 32ª, which is connected to the knife by means of an arm 33 and link 33ª.

Arranged adjacent to the trimming mechanism is a mechanism which is adapted to roughen the trimmed backs of the books so as to better prepare them for receiving the adhesive or binding material. Such mechanism may be of any suitable or desirable form and is herein shown (see Figs. 2, 5, 11, and 12) as comprising spring-pressed disk clamps 35 adapted to hold the edges of the leaves or signatures firmly while they are being operated upon by roughing cutters 36. The said roughing cutters are preferably of rotary form and arranged diagonally to the back of the book adjacent to the bight of the clamping disks 35, as shown in the drawings. Any suitable driving means for the cutters may be provided. As shown in the drawings, the shafts of the cutters are connected by a belt 37 with a counter shaft 37× in the lower part of the frame, which is driven by means of belts 37ᵃ and 37ᵇ and counter shaft 37ᶜ from the main driving shaft 2.

Next in position along the path of the carrier, in the illustrated embodiment, are suitable brushing means for removing dust and loose particles left adherent upon the back of the book by the roughing cutters. Such means may be of any suitable or convenient form, and are herein shown (see Fig. 2) as comprising a rotary brush 38, driven from shaft 2 by belts 38ᵃ and 38ᵇ and suitably positioned to contact with the back of the book as it is brought into operative relation thereto by the carrier. Any suitable means may be provided for conveying the chips and dust away from the cutters and the brush. Such means are herein shown as comprising a suitable casing 39 and an exhaust fan 39ᵃ driven from shaft 2 by a belt 39ᵇ.

Next in order along the path of the carrier, in the illustrated embodiment, are arranged suitable mechanisms for applying an adhesive and binding substance to the back of the books. Such mechanism, or mechanisms, may be of any suitable or convenient form, and are herein shown (see Figs. 2 and 5) as a series of fountains 40, for holding an adhesive which may be in a liquid or semi-liquid state. The applying means may be of any suitable or desired form. As shown, the same consists of rolls 41, one for each fountain, rotating in the adhesive material and positioned so as to contact with the back of the books when brought into operative relation thereto by the carrier. Suitable driving means may be provided of any desired form, and a form of such means is shown in the drawings comprising a shaft 42 geared to shaft 3 and connected with the shafts of the rolls 41 by a sprocket and chain gear 42ᵃ.

In accordance with one feature of the invention there is attached a layer of fibrous material, preferably consisting of cotton batting (although crash, or other suitable substance may be used) to the back of the book for the purpose of more firmly binding the back edges of the leaves together and also for uniting more firmly the cover and back edges of the leaves. With these aspects of the invention in view, means for performing the said operation are provided, and one form of such means is shown in detail in Figs. 2 and 4 of the drawings, the same forming an embodiment of one feature of the invention. The said means embraces a stationary support for the fibrous layers or strips and means for taking the strips from the support and applying them to the backs of the books. The illustrated embodiment of such means comprises a horizontal table 43 suitably fixed upon the machine frame and a vertically movable table 45 having a series of guide slots in which slide a series of fingers 46, having at their ends upturned gage portions 47. The said fingers 46 are arranged to move horizontally into slots 44 of the table 43 and form a conveyer in that they act to receive the strip of cotton batting or other backing material when the table 45 is down, then to move out of the slots 44 and convey the material from the table 43 to a point beneath the carrier, the material being positioned accurately by the gage portions 47, the table 45 then being moved with its fingers 46 upwardly to press the material onto the back edge of the book. As shown, the fingers 46 are connected together at their inner ends, and they are given a longitudinal movement to and from the table 43 by a cam 51 fixed on the shaft 3 and connected with the fingers by links 48, rock arms 49 and 50 and the adjustable link 52, the adjustment of the link 52 being for the purpose of properly positioning the strip for books of different widths. The slotted table 45 is mounted upon a rod 53, slidably carried by the frame of the machine, and with its free end resting upon one end of a lever 54, the other end of which engages a suitable cam 55 carried on the shaft 3.

Means for applying the cover are next arranged along the path of the carrier, in the illustrated embodiment, and as regards the general features of the invention such means may be of any suitable form. In the form herein shown (see Figs. 1, 3, and 10) said means comprise a table 56, carrying a stack of cover blanks, said table being adapted to lift the top blank of the stack into contact with the back of the book, so as to attach the blank to the book by the adhesive material which oozes through the layer of fibrous material. Suitable means for giving the desired movement to the table are provided, and, as herein shown, such means comprise a threaded shaft 57 upon which the table is mounted and having a nut 58 threaded thereon but being restrained from rotation therewith. Contacting at one end with the nut 58 is a pivoted lever 59, its other end coöperating with a cam 60 fixed upon the shaft 3. It will be understood that under the action of the cam and lever the nut 58 and rod 57 will have an up-and-down motion, carrying with it the table 56 and the stack of covers lying thereon. Suitable guides for properly registering and holding in alinement the stack of covers are provided and are herein shown as longitudinally and transversely adjustable fingers 61 and 61ᵃ, respectively. The members of each set of fingers are preferably independently adjustable to accommodate different sizes of covers, the adjustment being effected in each case by a suitable screw rod and hand wheel as shown. As the covers are removed from a stack, it is necessary to lift the same gradually to keep the top thereof constantly in position to bring the top blank into proper contact with the book. This is effected, in the present embodiment, by changing the relation of the table 56 to the nut 58 through rotation of the screw-threaded rod 57 in the nut 58 by suitable actuating means. The said actuating means for the rod 57, as illustrated, comprises both an automatic and manually-operated means for effecting the desired result. Connected to the said rod 57 by miter gears 62 is a shaft 63, having fixed thereon a ratchet wheel 64, actuated by a pawl 65, which in turn receives movement from a cam 68 of shaft 3 through a link 66 and two arms on a transverse rock shaft 67. A handwheel 69 is provided on the shaft 63 for quickly restoring the table to a depressed position in order to receive a new stack of covers and for the purpose of changing its relation to the feed mechanism.

After leaving the cover-attaching mechanism, the books are subjected to the action of certain pressing and pinching mechanisms which serve to press the covers firmly onto the backs of the books and to pinch and break the covers around the back edges of the books. In the illustrated embodiment (see Figs. 1 and 6) the said pinching or breaking mechanism comprises a bed 70, and a pair of jaws 70$^a$, all of such length as to engage three of the books in the carrier and having such mutual relation and such relation to the books as to engage the backs of the books and to grasp the covers and the edges of the books contiguous thereto and firmly press them together and fold the covers sharply over the edges of the books. The said bed 70 is mounted to slide vertically and is lifted intermittently to cause it to press the covers against the backs of the books by means of a pair of levers 71 suitably fulcrumed on the base of the machine and operated by a pair of cams 71$^a$ on the shaft 3. The said jaws are slidably mounted in a suitable manner, as upon rods 71$^b$, fixed to the bed 70. As shown, the jaws 70$^a$ are connected by suitable trains of link-and-lever mechanism, designated generally by the reference numeral 72, and clearly shown in Fig. 6, to a shaft 73, which is oscillated through the medium of a link 74 by a cam 75 carried upon the shaft 3. Suitable adjusting means are provided for the purpose of varying and determining the amount of pressure to be applied by the jaws and to enable them to operate upon books of different thicknesses, the form of such adjusting means herein shown comprising screw-threaded rods 74$^a$, upon which the fulcra of one pair of levers of the link-and-lever mechanism for the jaws is threaded. The said screw rods may be provided with handwheels 75$^a$ for convenience in turning.

The machine may be arranged so that the books after being subjected to the last mentioned operations are carried by the carrier for some distance while the adhesive material is setting. After such material has set to some degree, it may be found advantageous to administer a final pressing to the back of the now completely bound and covered book, and in Figs. 1 and 8 of the drawings one form of mechanism for effecting this is shown. Suitably arranged contiguous to the carrier is a pad or face 76 mounted to come in contact with the book when the same is in proper operative position, and to recede therefrom after having exerted a proper pressure upon the back thereof. To furnish this movement the said face or pad is shown as mounted upon a rod 77, vertically slidable in the frame of the machine, and having fixed thereto a friction roll 78, contacting with a cam 79 on the shaft 3. A pressure is thus applied perpendicularly to the plane of the book back and while the book is at rest.

The completed book is now delivered from the machine by suitable means. While any suitable means may be employed for this purpose, as regards some aspects of the invention, the means shown are constructed according to one feature of the invention. In the illustrated embodiment (see Figs. 1 and 7) said means comprises mechanism for throwing off the plate 12 in order to release the books from the pressure of the clamps, and mechanism for receiving and conveying away the books as they pass out of the clamps. The opening means for the clamps preferably and as shown consist of a pair of fingers 15$^a$, like the fingers 15, for opening the clamp to receive the books, and like said fingers 15 mounted on the bar 16 which is constructed of such length as to receive both pairs of fingers. Arranged directly beneath the clamps as they open are curved guiding plates 80, which serve, as the books slide downwardly from the clamps, to lay the covers in place along the sides of the books. The books are then received upon a curved receiving table 81, located just below the carrier at the above described point, which deflects them, positioned upon their sides, on to a traveling conveyer, shown as a series of traveling tapes 82, which carry them outwardly to be removed by hand or otherwise. The tapes are driven in any suitable way, as by a belt 83 which receives motion from a small pulley on shaft 3 and transmits the motion by a pulley 84 and gears 85 to one of the rollers on which the tapes 82 are mounted.

In Fig. 13 of the drawings is shown a form of book bound in the manner hereinbefore described, the leaves being indicated by $x$, the fibrous strip by $y$, and the cover by $z$.

The manner of operation of the various mechanisms which go to make up the machine having been described in connection with the construction thereof, the operation of the machine as a whole will be readily understood by those skilled in the art without further description, as will also the results produced and advantages attained other than those hereinbefore specified.

The embodiment of my invention herein shown and described is adapted to bind and cover books by the method and manner in accordance with which a group of signatures or leaves is firmly held, the back is trimmed or cut away, after which the back is roughened or abraded, cleaned, receives one or more applications of an adhesive and then has a fibrous strip applied thereto, then the cover which is pressed into place and broken along the edges of the back. The back is then allowed to set somewhat, the back receives a final pressing and the covered book is delivered from the machine. It is to be understood that the invention as regards certain of its features is not limited to machines used in connection with this particular process and manner of covering and binding, nor is it limited to the particular mechanisms illustrated, nor to the particular constructions or arrangements of the mechanisms illustrated, nor to any particular constructions by which the invention has been or may be carried into effect as many changes may be made in the construction and arrangement of the parts without departing from the main principles of the invention and without sacrificing its chief advantages.

What I do claim as my invention and desire to secure by Letters Patent, is:

1. A book binding and covering machine having in combination an endless carrier provided with a holder for a book, said carrier having its path of travel lying in a substantially horizontal plane and having right-line stretches, and mechanisms for performing, respectively, upon the book carried by the carrier various operations involved in binding and covering, said mechanisms being arranged in series part along one stretch and part along another.

2. A book binding and covering machine having in combination an endless carrier provided with a holder for a book, said carrier being arranged so that its path of travel lies in a substantially horizontal plane, and having substantially parallel stretches arranged to move in straight lines, and mechanisms for performing, respectively, upon the book carried by the carrier various operations involved in binding and covering, said mechanisms being arranged in opposite series along the said stretches.

3. A book binding and covering machine having in combination an endless carrier provided with a series of holders for books, said carrier being arranged so that its path of travel lies in a substantially horizontal plane, and being disposed so as to include comparatively long stretches each extending in a right line, receiving and delivery means constructed and arranged to coact with the holders on said carrier, clamping and trimming mechanism, roughing mechanism, brushing mechanism, adhesive-applying mechanism, cover-attaching mechanism, and cover-breaking mechanism, part of said mechanisms being arranged along one of said right-line stretches of the carrier and part along another of said right-line stretches, means for intermittently moving the carrier step-by-step to convey the books from one mechanism to the next, and means for operating said mechanisms.

4. A book binding and covering machine having in combination an endless carrier provided with a holder for a book, said carrier being arranged so that its path of travel lies in a substantially horizontal plane and having substantially parallel stretches arranged in straight lines, a receiving mechanism, a clamping and trimming mechanism, a roughing mechanism, and a brushing mechanism arranged in the order indicated along the path of the carrier on one of said stretches and in a position suitable for operating upon a book conveyed by the carrier, an adhesive-applying mechanism, a cover-attaching mechanism, and a cover-breaking mechanism arranged in the order indicated along the opposite stretch of the carrier and in a suitable position for operating upon a book conveyed by the carrier, and a delivery device contiguous to the receiving device.

5. A book binding and covering machine having in combination a series of mechanisms for performing upon books various operations involved in binding and covering, an endless chain comprising a series of link members, a series of clamp parts each clamp part wholly supported by one of said link members and coöperating therewith to hold a book, means for actuating said chain for carrying the books to the various mechanisms successively, and supports and guides for said chain, said supports and guides being arranged to cause the chain to move in a horizontal orbit, and said clamp parts being located outside of their respective link members whereby said parts and members are adapted to carry the books in substantially vertical planes outside of the planes of said supports and guides for the chain.

6. A book binding and covering machine having in combination a series of mechanisms for performing the various operations involved in binding and covering, a carrier comprising a series of link members having book-engaging surfaces arranged in substantially vertical planes, said link members being pivotally united on axes provided with guide numbers mounted vertically, guides in which the guide members travel to support and guide the carrier, said guides being arranged in parallel relation to the planes in which the book-engaging surfaces are arranged, plates carried by and parallel to said link members and spring-pressed toward said link members.

7. A book-binding and covering machine including in combination, means for holding a book, and mechanism for applying a strip of fibrous material to the back of the book, said mechanism comprising a fixed support for the strip and a movable support for the strip arranged to take the strip from the fixed support and apply it to the back of the book.

8. A book binding and covering machine having in combination means for holding a book, and a mechanism for applying a strip of fibrous material to the back of the book comprising a fixed horizontal support, a conveyer having means movable in the plane of the fixed horizontal support to remove the strip of material from the horizontal support and position it beneath the book and being then movable to bring the strip of material into contact with the back of the book.

9. A book binding and covering machine having in combination means for holding a book, and a mechanism for applying a strip of fibrous material to the back of the book, said mechanism comprising a table having slots, a movable conveyer provided with fingers adapted to enter said slots and having registering means for properly positioning the strip of fibrous material upon the fingers, and means for moving the conveyer so that the strip of material carried thereby is brought into contact with the back of the book.

10. A book binding and covering machine having in combination means for holding a book, and a mechanism for applying a strip of fibrous material to the back of the book, said mechanism comprising a horizontal table having slots, a movable conveyer provided with fingers adapted to enter into the slots in the table, and also provided with a gage for positioning the fibrous material, and means for moving the fingers horizontally into the slots in the table in order to receive the strip and then withdrawing them in order to remove and position the strip, and for then moving the conveyer upwardly to bring the strip into contact with the back of the book.

11. A book binding and covering machine having in combination means for holding a book, and a mechanism for applying a strip of fibrous material to the back of the book, said mechanism comprising a horizontal table having slots, a movable conveyer provided with fingers adapted to enter into the slots in the table, and also provided with a gage for positioning the fibrous material, and means for moving the fingers horizontally into the slots in the table in order to receive the strip and then withdrawing them in order to remove and position the strip, and means for then moving the conveyer vertically to bring the strip into contact with the back of the book.

12. A book binding and covering machine having in combination means for holding a book, and mechanism for applying a strip of fibrous material to the back of the book, said mechanism comprising a slotted table, a movable conveyer having fingers adapted to enter the slot to receive a strip of material, the ends of said fingers being bent up to constitute a positioning gage for the strip, and means for moving the fingers into the slots to receive the strip and then withdrawing them to remove and position the strip, and for then moving the conveyer so that the strip is brought into contact with the back of the book.

13. A book binding and covering machine having in combination means for holding a book, means for attaching a cover to the back of the book, means for breaking the cover around the edges of the back, said means comprising jaws slidable toward and from each other and fulcrumed levers linked to said jaws to slide them, and means for varying the relative positions of the fulcra of the levers.

14. A book binding and covering machine having in combination means for holding a book, means for attaching a cover to the back of the book, means for breaking the cover around the edges of the back, said means comprising jaws slidable toward and from each other, levers linked to said jaws to move them, the levers linked to one of said jaws being fulcrumed upon traveling nuts mounted upon screw-threaded shafts, and means for actuating the levers.

15. A book binding and covering machine having in combination a series of mechanisms for performing the various operations involved in binding and covering, a carrier comprising a series of link members pivotally connected to each other, a plate mounted substantially parallel to each link member and having a plurality of guiding pins passing through the link member, spring means for impelling the plate toward the link member, and means coacting with the said pins to separate the plate from the link member in order to permit a book to be received or delivered.

16. A book binding and covering machine having in combination a series of mechanisms for performing the various operations involved in binding and covering, a carrier for a book having holding means for the book comprising a link member and a plate, one spring-pressed toward the other, said plate being provided with guiding pins passing through the link member, delivery means for receiving a book from the holding means, and means for engaging and moving said guiding pins in order to separate the link member and plate to allow the book to pass from the holder to the delivery means.

17. A book binding and covering machine having in combination a carrier provided with means for holding a book in a vertical plane, endless conveying means located contiguous to the carrier, means for causing the holding means to release the book and means for guiding the book from the holding means to the conveyer and for causing it to pass to the conveyer in a horizontal plane.

18. A book binding and covering machine having in combination a carrier provided with means for holding a book in a vertical plane, horizontally-disposed, endless conveying means contiguous to but on a lower level than the carrier, a curved plate located below the carrier and at one end of the conveying means so disposed and arranged that as a book leaves the carrier it will be guided and deflected by the plate so as to pass onto the conveying means in a horizontal plane.

19. A book binding and covering machine having in combination a horizontally disposed carrier comprising a member having a vertically arranged book-engaging surface, a plate substantially parallel to said surface and spring-pressed toward it so as to constitute a holder for a book, a horizontally-disposed endless conveying means extending outwardly from the machine, a curved plate below the carrier and at one end of the endless carrier so located and arranged that as the book leaves the carrier it will be guided and deflected by the plate from the vertical members of the holder onto the horizontally arranged conveying means, and means for separating the members of the book holder when the latter is above the conveyer.

20. A book binding and covering machine having in combination, an endless carrier provided with a series of holders for the books, said carrier having a path of travel lying substantially in a horizontal plane and having right line stretches, means for intermittently moving said carrier step by step, mechanisms for performing upon the books carried by the carrier various operations involved in binding and covering, said mechanisms being arranged in series part along one stretch and part along another stretch of the carrier, and means for operating said mechanisms simultaneously during the intervals between the operations of the said carrier moving means.

21. A book binding and covering machine having in combination, an endless carrier provided with a series of holders for the books, said carrier being arranged with its path of travel in a substantially horizontal plane and having substantially parallel stretches arranged to move in straight lines, means for intermittently moving the said carrier step by step, mechanisms for performing upon the books carried by said carrier various operations involved in binding and covering, said mechanisms being arranged along opposite stretches of said carrier and means for intermittently operating said mechanisms simultaneously between the operations of the said carrier moving mechanism.

In testimony whereof I have signed my name to this specification in the presence of two subscribing witnesses.

ALFRED BREDENBERG.

Witnesses:
　Jas. De F. Burroughs,
　J. W. Werner, Jr.

---

Copies of this patent may be obtained for five cents each, by addressing the "Commissioner of Patents, Washington, D. C."